(12) United States Patent
Bamford et al.

(10) Patent No.: US 9,069,483 B2
(45) Date of Patent: *Jun. 30, 2015

(54) SYSTEM AND METHOD FOR MONITORING TWO-WIRE COMMUNICATION IN A NETWORK ENVIRONMENT

(71) Applicant: Cisco Technology, Inc., San Jose, CA (US)

(72) Inventors: Harold E. Bamford, Woodridge, IL (US); Ted R. Mila, Bartlett, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,511

(22) Filed: Jul. 21, 2014

(65) Prior Publication Data

US 2014/0330997 A1 Nov. 6, 2014

Related U.S. Application Data

(63) Continuation of application No. 13/335,729, filed on Dec. 22, 2011, now Pat. No. 8,812,760.

(51) Int. Cl.
*G06F 13/00* (2006.01)
*G06F 13/40* (2006.01)
*G06F 5/06* (2006.01)
*G06F 13/42* (2006.01)

(52) U.S. Cl.
CPC ............ *G06F 5/065* (2013.01); *G06F 13/4004* (2013.01); *G06F 13/4282* (2013.01); *G06F 13/4291* (2013.01); *G06F 13/00* (2013.01); *G06F 13/40* (2013.01); *G06F 13/42* (2013.01); *G06F 13/4068* (2013.01)

(58) Field of Classification Search
CPC ............ G06F 13/4004; G06F 13/4282; G06F 13/4291
USPC .................................. 710/110, 200, 313, 314
See application file for complete search history.

(56) References Cited

U.S. PATENT DOCUMENTS

| | | | |
|---|---|---|---|
| 6,591,322 B1 * | 7/2003 | Ervin et al. | 710/110 |
| 6,834,318 B2 * | 12/2004 | Hunter et al. | 710/110 |
| 6,851,001 B1 * | 2/2005 | Oudet | 710/104 |
| 7,149,838 B2 * | 12/2006 | Ervin | 710/306 |

(Continued)

OTHER PUBLICATIONS

USPTO Oct. 22, 2013 Non-Final Office Action from U.S. Appl. No. 13/184,302.

(Continued)

*Primary Examiner* — Ryan Stiglic
(74) *Attorney, Agent, or Firm* — Patent Capital Group

(57) ABSTRACT

An example method is provided and includes receiving, from a host device, a first signal over a two-wire bus to an address on the two-wire bus corresponding to a small form factor (XFP) module, the host device being located outside the XFP module, the two-wire bus coupling the host device with a first controller inside the XFP module and a second controller inside the XFP module that share the address such that the first controller and the second controller receive the first signal, and blocking a second signal from the second controller to the host device using digital isolation buffers. A third signal from the first controller to the host device over the two-wire bus is not blocked. In specific embodiments, the first controller includes a XFP compliant controller and the second controller includes an optical controller.

20 Claims, 7 Drawing Sheets

(56) References Cited

U.S. PATENT DOCUMENTS

| | | | |
|---|---|---|---|
| 7,284,079 B2* | 10/2007 | Ervin | 710/110 |
| 7,417,464 B2* | 8/2008 | Crawford | 326/89 |
| 7,444,453 B2* | 10/2008 | Ellison | 710/311 |
| 7,634,611 B2* | 12/2009 | Hidai et al. | 710/314 |
| 7,689,756 B2* | 3/2010 | Ellison | 710/311 |
| 7,840,734 B2* | 11/2010 | Murfett et al. | 710/106 |
| 8,750,710 B1 | 6/2014 | Hirt et al. | |
| 8,812,760 B1 | 8/2014 | Bamford et al. | |
| 2004/0225812 A1* | 11/2004 | Ervin | 710/305 |
| 2004/0225813 A1* | 11/2004 | Ervin | 710/305 |
| 2004/0225814 A1* | 11/2004 | Ervin | 710/305 |
| 2005/0246475 A1* | 11/2005 | Ervin | 710/306 |
| 2006/0212634 A1* | 9/2006 | Reay et al. | 710/300 |
| 2006/0290381 A1* | 12/2006 | Bui et al. | 326/91 |
| 2007/0028024 A1* | 2/2007 | Kottschlag | 710/305 |
| 2007/0156935 A1* | 7/2007 | Ellison | 710/106 |
| 2007/0220190 A1* | 9/2007 | Hidai et al. | 710/110 |
| 2007/0223920 A1 | 9/2007 | Moore et al. | |
| 2007/0250651 A1* | 10/2007 | Boecker et al. | 710/107 |
| 2008/0074150 A1* | 3/2008 | Crawford | 326/90 |
| 2008/0101801 A1 | 5/2008 | Khalouf et al. | |
| 2008/0183919 A1* | 7/2008 | Bourne et al. | 710/52 |
| 2008/0256276 A1* | 10/2008 | Ellison | 710/106 |
| 2008/0288684 A1* | 11/2008 | Ellison | 710/106 |
| 2009/0154872 A1 | 6/2009 | Sherrer et al. | |
| 2011/0302344 A1* | 12/2011 | Bell et al. | 710/110 |
| 2012/0066423 A1* | 3/2012 | Choo et al. | 710/110 |

OTHER PUBLICATIONS

Cisco Data Sheet, "Cisco ONS Pluggable Optics Series Modules for the Carrier Packet Transport (CPT) Platform," © 2011 Cisco; 15 pages.

Cisco White Paper, "Digital Transmission: Carrier-to-Noise Ratio, Signal-to-Noise Ratio, and Modulation Error Ratio," © 1992-2006 Broadcom Corporation and Cisco Systems, Inc.; 42 pages.

Cisco White Paper, "Wideband: Delivering the Connected Life," © 1992-2006 Broadcom Corporation and Cisco Systems, Inc.; 7 pages.

Cisco, "Chapter 1: Data Center High Availability Clusters," *Data Center High Availability Clusters Design Guide*, © 2006 Cisco Systems Inc.; 24 pages; http://www.cisco.com/en/US/docs/solutions/Enterprise/Data_Center/HA_Clusters/HAOver_1.pdf.

Cisco, "Chapter 14: Configuring Cisco Express Forwarding," *Cisco Catalyst 4000 Family Switch Cisco IOS Software Configuration Guide Release 12.1*(8a)EW; 10 pages; [retrieved and printed Feb. 27, 2013] http://www.cisco.com/en/US/docs/switches/lan/catalyst4500/12.1/8aew/configuration/guide/cef.pdf.

Cisco, "Chapter 3: Server Cluster Designs With Ethernet," *Cisco Data Center Infrastructure 2.5 Design Guide*, Dec. 6, 2007; 14 pages; http://www.cisco.com/en/US/docs/solutions/Enterprise/Data_Center/DC_Infra2_5/DCInfra_3.pdf.

Cisco, "Chapter 6: Configuring Basic Broadband Internet Access," May 2009; 6 pages.

Cisco, "Cisco CRS Carrier Routing System: Ethernet Physical Layer Interface Module Installation Note," © 2010; 74 pages; http://www.cisco.com/en/US/docs/routers/crs/crs1/plim/installation/guide/eth6437.pdf.

Cisco, "Implementing Nexus 7000 in the Data Center Aggregation Layer with Services," © 2008; 46 pages; http://www.cisco.com/en/US/docs/solutions/Enterprise/Data_Center/nx_7000_dc.pdf.

Cisco, "Virtual Machine Mobility with Vmware VMotion and Cisco Data Center Interconnect Technologies," © 2009; 17 pages; http://www.cisco.com/en/US/solutions/collateral/ns340/ns517/ns224/ns836/white_paper_c11-557822.pdf.

David Piehler, "Next-generation Components for Optical Access Networks," OSA/OFC/NFOEC 2011; 3 pages.

Villarruel, Fernando, "HFC Optical Architectures Primer," Cisco, Jul. 28, 2010; 56 pages.

Villarruel, Fernando, et al., "Pluggable Optics for HFC," Jun. 29, 2011, Cisco; 11 pages.

Villarruel, Fernando, et al., "Pluggable RF Optics," Jun. 10, 2011, 2011 Spring Technical Forum, Cisco; 8 pages.

International Telecommunication Union, "Series J: Cable Networks and Transmission of Television, Sound Programme and Other Multimedia Signals—Digital transmission of television signals," J.83, Dec. 2007; 66 pages.

Maxim Integrated Products, "Optical Microcontroller," DS4830, 19-5934; Rev. 1; Oct. 2011; 29 pages; http://datasheets.maxim-ic.com/en/ds/DS4830.pdf.

Maxim Integrated Products, "XFP Laser Control and Digital Diagnostic IC," DS1862, © 2007; 43 pages; http://datasheets.maxim-ic.com/en/ds/DS1862.pdf.

SFF Committee, "INF-8077i—10 Gigabit Small Form Factor Pluggable Module," Revision 4.5, Aug. 31, 2005; 192 pages; ftp://ftp.seagate.com/pub/sff/INF-8077.PDF.

Texas Instruments, "Dual Buffer/Driver With Open-Drain Outputs," SN74LVC2G07, © 2001-2008; 16 pages; http://www.ti.com/lit/ds/symlink/sn74lvc2g07.pdf.

Texas Instruments, "Low-Power Dual Digital Isolators," ISO7420, ISO7420M, ISO7421; 22 pages; http://www.ti.com/lit/ds/symlink/iso7421.pdf.

VMware VMotion, "Live Migration for Virtual Machines Without Service Interruption," Product Datasheet, © 2009; 2 pages; http://www.vmware.com/files/pdf/VMware-VMotion-DS-EN.pdf.

\* cited by examiner

US 9,069,483 B2

SYSTEM AND METHOD FOR MONITORING TWO-WIRE COMMUNICATION IN A NETWORK ENVIRONMENT

RELATED APPLICATION

This application is a continuation (and claims the benefit of priority under 35 U.S.C. §120) of U.S. application Ser. No. 13/335,729, filed Dec. 22, 2011, entitled "SYSTEM AND METHOD FOR MONITORING TWO-WIRE COMMUNICATION IN A NETWORK ENVIRONMENT," naming Harold E. Bamford, et al. as inventors. The disclosure of the prior application is considered part of (and is incorporated by reference in) the disclosure of this application.

TECHNICAL FIELD

This disclosure relates in general to the field of communication and, more particularly, to monitoring two-wire communication in a network environment.

BACKGROUND

Many cable transport systems strain to handle an increasing volume of Internet traffic, which includes an expanding array of video services. For example, internet protocol (IP) video is consuming cable bandwidth and, further, it is expected to grow exponentially. Subscribers are increasingly demanding "many services to many screens" models. Essentially, modern users desire the convenience of having services available anytime, anywhere, and on any device. To address these market requirements, cable companies are transitioning their cable systems to all-digital delivery: requiring flexible management of an expanding array of converging services. As cable headends converge, new technology advances in cable television (CATV) headend access optics should: (1) improve off-line power efficiency; (2) reduce space requirements due to limited space and limited heating, ventilation and air conditioning (HVAC) capacity; (3) provide a unified customer interface; and (4) reduce cost.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one example embodiment, a method is provided that includes receiving a first signal transmitted to an address on a two-wire bus from a master device, where the two-wire bus couples the master device with a first slave and a second slave that share the address such that the first slave and the second slave receive the first signal. The method may also include blocking a second signal from the second slave to the master device using digital isolation buffers.

In particular embodiments, the digital isolation buffers are configured between the master device and the second slave. In addition, the two-wire bus may include a bidirectional clock line and a bidirectional data line. The digital isolation buffers may include a first digital isolation buffer located on the clock line between the master device and the second slave, and a second digital isolation buffer located on the data line between the master device and the second slave.

The first slave may be a small form factor (XFP) compliant controller located inside an XFP module and the second slave is an optical microcontroller in the XFP module. The master device may be located on a physical layer interface module (PLIM) in a cable modem termination system (CMTS). The second signal can be an acknowledgement (ACK) signal, a no-acknowledgement (NACK) signal, or a clock stretch signal. The first signal can be data to be written to memory at the address. A method may also include writing the data to memory at the first slave, and writing the data to memory at the second slave. The data may include a laser temperature, a laser bias, a safety protocol, and a modulator bias.

Example Embodiments

Figure 1:
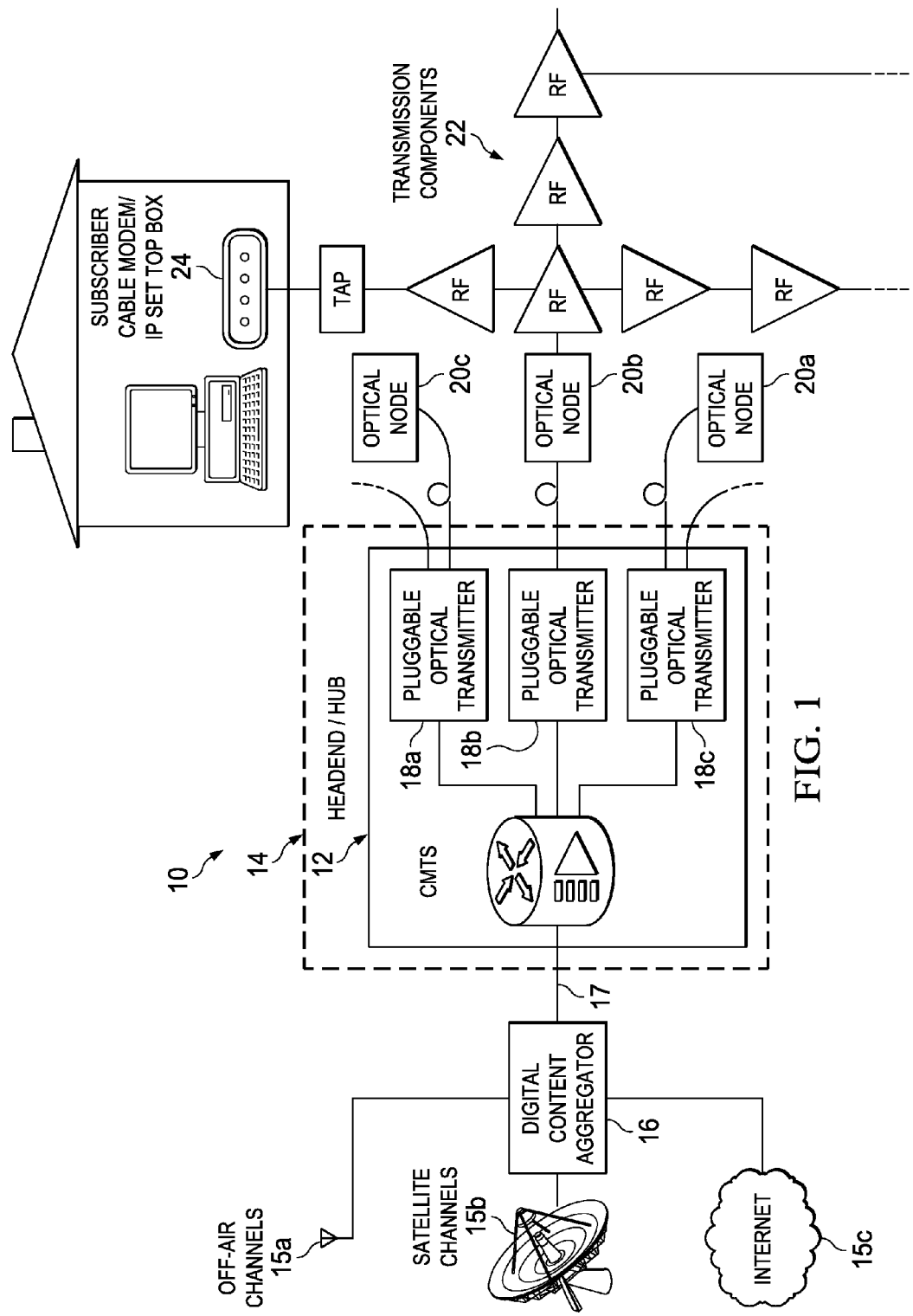
FIG. 1 is a simplified block diagram of a communication system for monitoring two-wire communication in a network environment in accordance with one embodiment of the present disclosure.

Turning to FIG. 1, FIG. 1 is a simplified block diagram of a communication system 10 for monitoring two-wire communication in a network environment. FIG. 1 includes a cable modem termination system (CMTS) 12, which may be located at a cable company's headend/hub 14. A headend can be viewed as a master device configured for distributing data and video programming signals from a plurality of sources, which could include off-air channels 15a, a satellite 15b, and an Internet 15c. The data and video programming signals may be collected into a digital stream by a digital content aggregator 16, with transmission through a baseband digital link 17 terminating in CMTS 12. The signals may be broadcast from headend/hub 14 through one or more pluggable optical transmitters 18a, 18b, and 18c to fiber nodes 20a, 20b, and 20c via fiber optic cables. One or more transmission components 22 (including radiofrequency (RF) amplifiers, coaxial cables, and taps) may carry the signals to subscriber premises, for example, to a subscriber cable modem/Internet protocol (IP) set top box 24.

According to embodiments of the present disclosure, pluggable optical transmitters 18 may be implemented on a small form factor (XFP) pluggable package. Such elements may be capable of accepting RF inputs modulated according to Quadrature Amplitude Modulation (QAM) techniques (e.g., possessing both amplitude and phase modulation), for example, according to ITU-T J.83 Annex A, Annex B, or Annex C modulation, Digital Audio Video Council (DAVIC), or Digital Video Broadcasting-Cable (DVB-C). RF inputs may include a "full-spectrum" channel loading (e.g., 160 channels) of QAM-modulated RF content spanning a range of frequencies (e.g., 45 MHz to 1003 MHz). The XFP package (10 Gigabit small form factor pluggable) is typically a standard form-factor for transceivers (e.g., used in high-speed computer network and telecommunication applications that use optical fiber). XFP modules may typically operate at optical wavelengths of 850 nm, 1310 nm, 1550 nm, etc. In certain embodiments, the XFP dimensions can be in the approximate order of: (1) Height: 0.33 inches (8.5 mm); (2) Width: 0.72 inches (18.3 mm); and (3) Depth: 3.1 inches (78 mm). RF circuitry in pluggable optical transmitters 18 may be implemented using dense integrated circuit technologies.

According to embodiments of the present disclosure, pluggable optical transmitters 18 may be plugged into a chassis of CMTS 12. Pluggable optical transmitters 18 may comprise an internally corrected transmitter, containing relevant circuitry and correction elements to provide transmission, or alternatively rely upon external correction as provided by CMTS 12, or by optical elements following pluggable optical transmitters 18. Pluggable optical transmitters 18 may be utilized to provide downstream (DS) transmission (e.g., from headend to subscriber) and, further, may be designed to integrate directly into CMTS 12: providing a full spectrum, 160-channel QAM output, per-transmitter, per-CMTS port. CMTS 12 may also provide RF signals that have additional channels, and may be modulated according to techniques other than QAM (e.g., orthogonal frequency-division multiplexing-quadrature phase-shift keying (OFDM-QPSK)).

Pluggable optical transmitters 18 of FIG. 1 may effectively avoid the separated optics paradigm with their separate support hardware, monitoring and/or control mechanisms, and software. For example, additional chassis, shelves, or power supplies may not be necessary when pluggable optical transmitters 18 are employed in communication system 10. Furthermore, status monitoring, control hardware, and control software may also be eliminated (or at least minimized) since pluggable optical transmitters 18 may be fully integrated into CMTS 12 and may also be controlled by (and reported back through) CMTS 12. In an example embodiment, optics appropriately integrated into CMTS ports can allow baseband digital return path opportunities without a remapping of the RF spectrum at headend/hub 14.

Pluggable optical transmitters 18 of FIG. 1 may communicate with other components inside CMTS 12 using a two-wire communication bus. Pluggable optical transmitters 18 may use off-the-shelf microcontrollers to perform control functions of its internal components (e.g., laser transmitters). According to embodiments of the present disclosure, pluggable optical transmitters 18 may use digital isolation buffers to facilitate communication between components of CMTS 12 and pluggable optical transmitters 18.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. Communication system 10 may also operate in conjunction with, or as part of, a video over IP delivery network or other suitable protocol, for retransmission of video programming or services.

Figure 2:
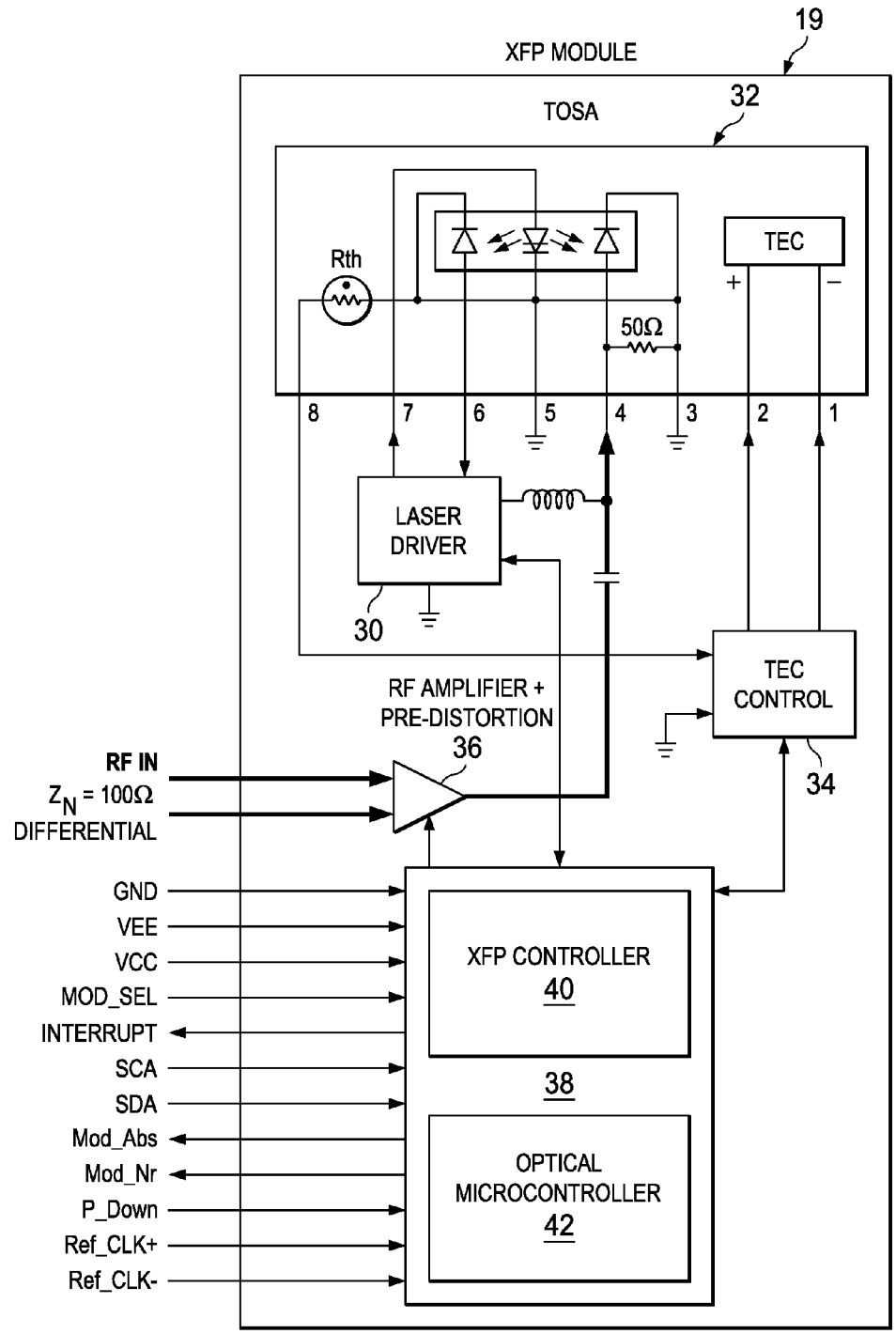
FIG. 2 is a simplified block diagram of a component of the communication system in accordance with one embodiment of the present disclosure.

Turning to FIG. 2, FIG. 2 is a simplified block diagram of a pluggable optical transmitter in an XFP module 19 according to embodiments of the present disclosure. Note that the term 'XFP module' is interchangeable with 'pluggable optical transmitter', as used herein in this Specification. XFP module 19 may be configured in an XFP form factor to receive RF input from a host board (not shown) such as a physical layer interface module (PLIM) in CMTS 12. It can also convert the data to an optical signal through a laser driver 30 that controls a laser diode in a Transmitter Optical Sub-Assembly (TOSA) 32. A thermo-electric cooling (TEC) control 34 may be connected to TOSA 32 to control the TEC module therein. A pre-distortion RF amplifier RF variable attenuator 36 may receive RF differential signals from the host board. A controller block 38 (including various pins for input/output as shown) may also be configured in the pluggable optical transmitter to control the various functions of the transmitter. Controller block 38 may include an XFP controller 40 and an optical microcontroller 42 (including one or more processors and one or more memory elements) for performing controlling functions.

Figure 3:
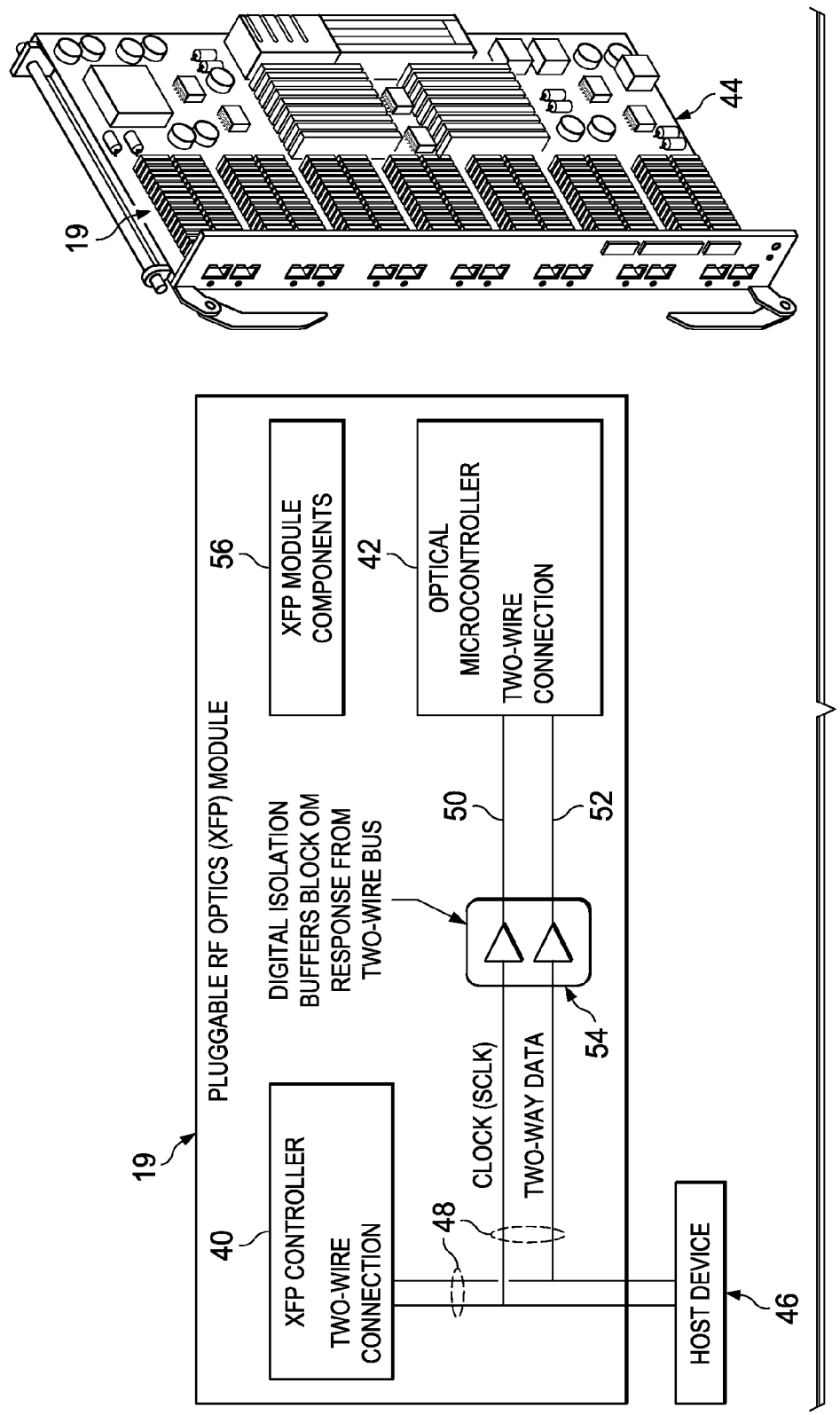
FIG. 3 is a simplified block diagram of the component illustrating additional details in accordance with an embodiment of the present disclosure

Turning to FIG. 3, FIG. 3 is a simplified block diagram of a particular pluggable optical transmitter associated with a PLIM 44. PLIM 44 may include one or more pluggable RF optics (XFP) modules 19. PLIM 44 may be a part of CMTS 12 (or a router or a switch, etc.) in communication system 10. XFP module 19 may typically be a hot-swappable input/output device that plugs into an XFP port of CMTS 12 (via PLIM 44) to link the port with the network.

In an example embodiment, PLIM 44 may comprise several (e.g., 14, 20, etc.) ports, supporting several (e.g., 1 to 14, 20, etc.) pluggable XFP modules. The PLIM typically provides packet interfaces for a routing system in the network. Optics modules on the PLIM, (such as XFP module 19) contain ports to which fiber-optic cables are connected. User data is received and transmitted through the PLIM ports and converted between optical signals (used in the network) and the electrical signals (used by the router components).

When a packet is transmitted from CMTS 12, XFP module 19 converts the electrical signal to an optical signal, and transmits the packet from PLIM 44 on an egress line card. PLIMs are configured to provide various functionalities, for example data packet buffering, Layer 2 processing, and multiplexing and demultiplexing of data streams. PLIMs may include power and clocking components, voltage and temperature sensors, and an Electrically Erasable Programmable Read-Only Memory (EEPROM), which stores configuration and hardware information.

A representative XFP module 19 is shown in a simplified block diagram in FIG. 3. According to embodiments of the present disclosure, XFP module 19 may include components of a transmitter and a control system. In other embodiments, XFP module 19 may additionally include components of a receiver and associated control systems: all of which should be included within the broad scope of the present disclosure. In this example implementation, XFP controller 40 and optical microcontroller 42 may include analog-to-digital converters (ADCs) to monitor operating status of XFP module 19 (e.g., case temperature, etc.). Similarly, digital-to-analog converters (DACs) may be provisioned to control parameters such as electro-absorption (EA) modulation voltage, etc., while a central processing unit (CPU) may be provisioned to manage XFP module 19, suitable memory, etc.

XFP controller 40 and optical microcontroller 42 may communicate with a host device 46 (which may be one or more components on PLIM 44) via a two-wire bus 48. Two-wire bus 48 typically comprises a bidirectional clock line 50 and a bidirectional data line 52. In an example embodiment, clock line 50 may be a bidirectional Serial Clock Line (SCLK or SCL), and data line 52 may be a bidirectional Serial Data Line (SDA). The SDA pin (corresponding to bidirectional data line 52) on XFP module 19 can be open-drain or open-collector driven (suitably wire-ORed with any number of open-drain or open collector devices). Through two-wire bus 48, host device 46 can read out management information of XFP module 19 (e.g., serial ID and digital diagnostics) and control various functions.

XFP module 19 may also include other components (referred to herein as XFP module components 56) including a transmitter optical sub assembly (TOSA), amplifiers, laser driver, etc. In various embodiments, XFP module 19 can contain both transmit and receive sections. For example, an electroabsorptive modulated laser (EML), a laser driver, and supporting circuits may constitute the transmit section, while a receiver optical sub assembly (ROSA), a post amplifier, and supporting circuits may constitute the receive section.

In some embodiments, XFP controller 40 may be an off-the-shelf XFP compliant controller such as DS1862 "XFP Laser Control and Digital Diagnostic IC," which can accommodate various communications protocols, along with monitoring and controlling XFP module 19 according to certain XFP standards. As used herein, an "XFP compliant controller" includes devices (e.g., controllers, microcontrollers, integrated circuits, etc.) with control functionalities that are compliant to at least some of the XFP standards as specified by SFF Committee INF-8077i Standards, as they pertain to memory management, two-wire interfaces, etc.

XFP controller 40 can handle several functions including communications between XFP module 19 and host device 46; however, XFP controller 40 may fail to provide other functions such as control functions for laser temperature, safety protocols, and/or modulation. In other instances, control functions of XFP controller 40 may be incompatible with an internal framework of CMTS 12. For example, components of XFP module 19 may be configured to operate at a constant current (bias) regardless of the output power, whereas the off-the-shelf XFP compliant controller may control the laser bias based on the optical output power. To provide the missing functionalities (or desired functionalities) such as control functions for laser temperature, bias (based on constant current rather than optical output power), safety protocols, and modulation, optical microcontroller 42 may be used. In example embodiments, optical microcontroller 42 may be an off-the-shelf general-purpose embedded microcontroller such as a Maxim DS4830 optical microcontroller.

According to embodiments of the present disclosure, both controllers (XFP controller 40 and optical microcontroller 42) may communicate using two-wire bus 48, and include one serial clock line (SCL) pin and one serial data line (SDA) pin each (e.g., for bidirectional clock line 50 and bidirectional data line 52, respectively). Two-wire bus 48 may be used for serial ID, digital diagnostics and other control/monitor functions. In particular, two-wire bus 48 may be used to provide setup information such as laser temperature, modulator bias, laser bias, etc. to optical microcontroller 42 from host device 46. Two digital isolation buffers 54 may block any response (or other signals) by optical microcontroller 42 on two-wire bus 48.

For purposes of illustrating certain example techniques of communication system 10, it is important to understand the communications that may be occurring in the network environment. The following foundational information may be viewed as a basis from which the present disclosure may be properly explained. XFP modules may contain transmit (and receive) sections, a microcontroller, a laser driver, and other supporting components. Generally, the microcontroller may be a custom silicon piece (for example, specially designed and fabricated), or it may be specially configured to work with specific components (e.g., as in a chipset). For example, Analog Device's chipset for use with XFP transceivers includes a signal conditioner ADN2928 that works with a precision analog microcontroller ADuC7020, trans-impedance amplifier ADN2821, and laser drivers ADN2525. For various reasons (including cost-reduction), instead of using custom silicon or chipsets, it may be desirable to integrate off-the-shelf components such as XFP compliant controller DS1862 and a general-purpose microcontroller such as DS4830, in the XFP module.

In regards to memory management within the XFP module, the inherent 256-byte two-wire address space is divided into lower and upper blocks of 128 bytes each. The lower block of 128 bytes is used for diagnostics and control functions. Multiple blocks of memory are available in the upper 128 bytes of the address space. These blocks can be individually addressed through a table select byte, which the user enters into a location in the lower address space. The upper address space tables are used for less frequently accessed functions such as serial ID, user writable EEPROM, reserved EEPROM, diagnostics and control spaces and vendor specific functions. For example, the upper address space tables are split into Table 00h (reserved for future diagnostic and control functions); Table 01h (serial ID EEPROM); Table 02h (User writable EEPROM); Table 03h-07Fh (vendor specific functions); and Table 80h-FFh (reserved).

Typically, the host device (e.g., host device 46) is configured to provide calibration values and other parameters used for controlling laser temperature, laser bias, modulators, etc. to the XFP module over the two-wire bus according to certain XFP standards. These parameter values are written to Table 02h of the user writable EEPROM in the XFP module's memory. Off-the-shelf XFP compliant controllers such as DS1862 may be configured with memory that is compliant to the XFP memory management specifications. For example, such off-the-shelf XFP compliant controllers may have memory partitioned into Tables 00h—FFh, unlike general embedded microcontrollers such as DS4830, which may not be hardwired with such memory partitioning.

However, although such off-the-shelf XFP compliant controllers may have the requisite memory partitioning, they may not perform all desired (or necessary) functions. For example, XFP controller DS1862 cannot control laser temperature, safety protocols (e.g., shut down mechanisms for high laser temperature, etc.), or modulators. Therefore, another general microcontroller (such as DS4830) may be needed to perform the missing functions. However, the general microcontroller may not have the required memory partitioning into which the host device can write parameter values over the two-wire bus. When the XFP compliant controller and general microcontroller are used together in an XFP module, the problem is to set calibration values in the general microcontroller using no additional device address or interfaces, and with low additional hardware and software. In particular, because a two-wire interface is mandatory for all XFP modules according to XFP standards, a challenge in such a scenario would be to use built-in two-wire protocol handlers available on off-the-shelf processors to facilitate communication using a single two-wire bus.

Typically, two-wire buses can allow a device (such as a microcontroller) to control a network of devices with just two general-purpose input/output (I/O) pins and software. In a typical two-wire bus, the standard protocol specifies a unique address for each device on the shared bus. The bus has two roles for communicating devices: (i) master, which is a device that issues the clock and addresses slaves; and (ii) slave, which is a device that receives the clock line and address. A device in this regard may be any electronic device, node, integrated circuit, service, application, or other object capable of sending, receiving, or forwarding information over communications channels in a network. As used herein, a "master device" is a device that can issue commands, generate clocks, and/or terminate transfers (of data). As used herein, a "slave device" is a device that receives or responds to a command. As used herein, a "host" is a specialized master that provides the main interface to the system's CPU and other functionalities. In some embodiments, a device may be designed to be a slave and not a master. In other embodiments, a device may act as a slave most of the time, but may become a master in certain instances. In yet other embodiments, a device may be designed to be a master consistently. In some embodiments, there may be, at most, one host in a system. Any number of masters or slaves can be present on a typical two-wire bus.

In operation, the master initially sends a START signal followed by the address of the slave it wishes to communicate with, and a bit representing whether it wishes to write to (e.g., 0), or read from (e.g., 1), the slave. If the slave exists on the bus, then it responds with an acknowledgement (ACK) signal (e.g., 0) for that address. If the slave is unable to accept the data, it may respond with a NACK signal (e.g., 1). As the data line naturally floats high, a NACK is equivalent to no response. Thus, only the targeted slave responds with a detectable signal. The slave is also allowed to hold down the clock line (for example, if it needs extra time to respond to the host's command). The master is required to read back the clock signal after releasing it to high state and then wait until the line has actually gone high. This method is referred to as clock stretching. As used in this Specification, a "clock stretch signal" refers to a low clock signal by the slave (i.e., the slave holding the clock line low). The master then continues to either transmit or receive (according to the read/write bit it sent), and the slave continues in its complementary mode (receive or transmit, respectively). Because all communication takes place on only two wires that connect all slaves to the master, all devices, especially slaves, have a unique address to identify each device on the bus.

The two-wire interface (e.g., the two-wire point of interaction between components on the two-wire bus) in XFP modules (such as XFP module 19), is modeled largely after typical digital monitoring interfaces; one significant distinction, however, is that the memory structure is changed to use a single address, namely A0h. According to general XFP two-wire interface protocol standards, for example as specified by SFF Committee INF-8077i standards, each XFP module 19 is hardwired at a single device address A0h, irrespective of the number of devices within the module. Thus, host device 46 communicates with XFP module 19 over the two-wire interface using the A0h device address. To host device 46, both XFP controller 40 and optical microcontroller 42, which are listening on two-wire bus 48, have the identical address A0h.

Typical two-wire interfaces can also be limited by similar address resolution problems. For example, a given address such as 0x51, may be used by a number of different devices such as 24LC02 or a 24C32 EEPROM, with incompatible addressing in the same system. Reliable configuration mechanisms to resolve this issue may be available to masters (or hosts) and can involve out-of-band mechanisms such as tables provided by system firmware (e.g., which list the available devices). The address resolution issue can also be partially addressed by address resolution protocol (ARP) in system management bus (SMBus) systems. In SMBus ARP, addresses are assigned (dynamically) by the master. However, according to XFP module standards or other framework requirements, multiple addresses may not be assigned to components within the XFP module. Therefore, out-of-band mechanisms or ARP may not be applicable to communication with components inside the XFP module via a single two-wire interface.

An alternative to resolve address resolution in XFP modules may be to build a two-wire protocol handler (using software) on one of the slave nodes (e.g., optical microcontroller 42) that would not respond with ACK, NACK, or DATA signals on the data line or "clock stretching" on the clock line. This software implementation is often called "bit banging." In bit banging, software on the slave node sets and samples pin states on a microcontroller, and may control parameters of the outgoing signal such as timing, levels, synchronization, etc. However, bit banging would require significant programming or extensive discrete logic and would suffer from speed problems.

Another alternative would be to write calibration values of parameters and other setup information to optical microcontroller 42 separately instead of communicating with optical microcontroller 42 on two-wire bus 48. Various calibration values may be written separately to optical microcontroller 42 by one of the following methods: (1) a separate two-wire address on the common two-wire bus; (2) a separate physical interface on optical microcontroller 42 (e.g., a separate two-wire bus or RS232 or serial peripheral interface (SPI) or the like); or (3) a separate "Chip Select" line (chip select (CS) line is a control line used to select one chip out of several chips connected to the same bus); or (4) hardware that could "proxy" for all devices and forward only those commands that are appropriate for one device or the other.

Each of these methods is problematic for various reasons. For example, method 1 (a separate two-wire address on the common two-wire bus) may not be permitted due to certain frameworks or protocols (e.g., according to XFP module requirements), or a need for a transparent method requiring no additional address allocations, or simplification of the interface to a single address (and using existing, commercial, off-the-shelf (COTS) parts as well), or to avoid namespace pollution (e.g., so as not to cause conflicts with other XFP module implementations), etc. Method 2 (a separate physical interface on optical microcontroller 42) requires custom silicon (e.g., specially designed microcontroller having more than one two-wire channel, or RS232 or SPI interface), as it may be difficult to implement using off-the-shelf silicon. For example, off-the-shelf optical microcontrollers having a separate two-wire interface may not be satisfactory inside an XFP module. In another example, even if the optical microcontroller 42 has an SPI interface, other components such as the XFP controller 40 and/or host device 46 may not have compatible SPI interfaces.

Method 3 (a separate CS line) may use a command pin on the microcontroller (e.g., optical microcontroller 42). When the chip select pin of one device is held in the inactive state, the device ignores changes in the state of its input pins; outputs are high impedance, so other chips on the same bus can drive those signals. When the chip select pin is held in the active state, the device responds as if it is the only chip on the bus. Because the other chips have their chip select pins in the inactive state, they are holding their outputs in the high impedance state, so the single selected pin can drive its outputs. The CS line method may require substantial hardware and software changes to the XFP module; for example, it may require a SPI bus, rather than a two-wire bus.

Method 4 (hardware that could "proxy" for all devices and forward only those commands that are appropriate for one device or the other) may be practically difficult to implement, and may require a substantially significant change to hardware and/or logic in the XFP module. For example, for some operations, the additional hardware would be unable to detect some errors soon enough to report them properly to host device 46. For many other operations, the additional hardware would have to mimic major portions of XFP controller 40, thus defeating the purpose of having XFP controller 40.

A system for monitoring two-wire communication in a network environment outlined by FIG. 1 can resolve these issues, among others. According to embodiments of the present disclosure, host device 46 communicates calibration values of various parameters such as laser temperature, modulator bias, laser bias, etc. to XFP module 19 over two-wire bus 48. For example, calibration values may have to be set in optical microcontroller 42, so that it can control laser diodes and other components according to its predefined functions.

XFP module 19 comprises multiple devices (for example, XFP controller 40 and optical microcontroller 42) listening to two-wire bus 48. To share data passed on the bus, two digital isolation buffers 54 are connected to data line 52 and clock line 50. The outputs of digital isolation buffers 54 are sent to optical microcontroller 42. Optical microcontroller 42 responds to commands sent on two-wire bus 48 and, ordinarily such responses would conflict with responses from XFP controller 40. However, in embodiments of the present disclosure, the responses from optical microcontroller 42 are blocked by digital isolation buffers 54. Thus, according to embodiments of the present disclosure, an isolated tap of two-wire bus 48 is used to listen to data addressed to another device (e.g., XFP controller 40) on the same two-wire bus 48. The buffering by digital isolation buffers 54 prevents electrical conflict on two-wire bus 48 that would arise from two (or more) devices responding to the same device address (i.e., A0h).

According to an example embodiment, host device 46 writes the calibration values to the XFP controller's memory blocks. Memory blocks in XFP module 19 may be divided into tables with Table 02h used for user writable parameters according to certain XFP standards. In an example embodiment, the memory tables of XFP module 19 are provisioned in XFP controller 40, which may be an off-the-shelf XFP compliant controller. Host device 46 writes the calibration values to Table 02h in XFP controller 40. Optical microcontroller 42 records the write operations to Table 02h and uses the written values as calibration values for parameters such as laser temperature, modulator bias, laser bias, etc. These values may remain unused within XFP controller 40 (for example, because XFP controller 40 does not control laser temperature, modulators, etc.).

According to embodiments of the present disclosure, the primary device (e.g., XFP controller 40) can serve as a proxy for the secondary device (i.e., optical microcontroller 42) and send responses to host device 46. The secondary device may not communicate with host device 46 (or any other device on two-wire bus 48), so it can send signals, or fail to respond, without interfering with anything else on two-wire bus 48. For example, complete failure to respond would have no impact on two-wire bus 48, or host device 46 or any other device (e.g., XFP controller 40) on two-wire bus 48. In one embodiment, clock stretch signals by the secondary device may not impact host device 46 whether or not host device 46 times out. Timeout is an issue for host device 46 and the primary device (e.g., XFP controller 40). Moreover, any leakage from the secondary device's SCL or SDA lines may be blocked by choosing appropriate digital isolation buffers 54.

Turning to the infrastructure of FIG. 3, in example embodiments, XFP module 19 may be a hot pluggable (i.e., system does not have to be shut down prior to installation) small footprint serial-to-serial data-agnostic multi-rate optical transmitter (or transceiver) that supports a variety of applications including IPTV. XFP module 19 may support various number of channels (e.g., 160, 153, 200, etc.) and/or quadrature amplitude modulation (QAM) (e.g., 64, 256, 1024, etc.) based upon particular needs and considerations. XFP module 19 may have an optical interface and an electrical interface. The optical interface transmits and receives fiber optic signals (e.g., through a set of fiber optic cables). The electrical interface transmits and receives electrical signals (e.g., through a circuit board connector mounted to PLIM 44). The channels and applications listed herein are merely for example purposes and are not intended to limit the scope of functionalities of communication system 10 described herein.

XFP controller 40 may be a closed-loop laser driver control integrated circuit (IC) with built-in diagnostics, automatic power control, and temperature indexed lookup table. XFP controller 40 can monitor several analog inputs including, for example, temperature and monitor diode (MD) current, which can be used to regulate laser bias current and extinction ratio of XFP module 19. Warning and alarm thresholds can be programmed to generate an interrupt if monitored signals exceed tolerance. Programming XFP controller 40 may be accomplished through two-wire bus 48.

In example embodiments, optical microcontroller 42 may provide optical control, calibration, and monitoring capabilities and include components such as analog-to-digital converter (ADC), digital-to-analog converter (DAC), in addition to the two-wire interface (e.g., pins corresponding to SCL line 50 and SDA line 52). An internal bootstrap loader may allow the device to be programmed over two-wire bus 48. In example embodiments, digital isolation buffers 54 may be a catalog (i.e., off-the-shelf) component such as Texas Instruments ISO7420 or Texas Instruments SN74LVC2G07.

Figure 4:
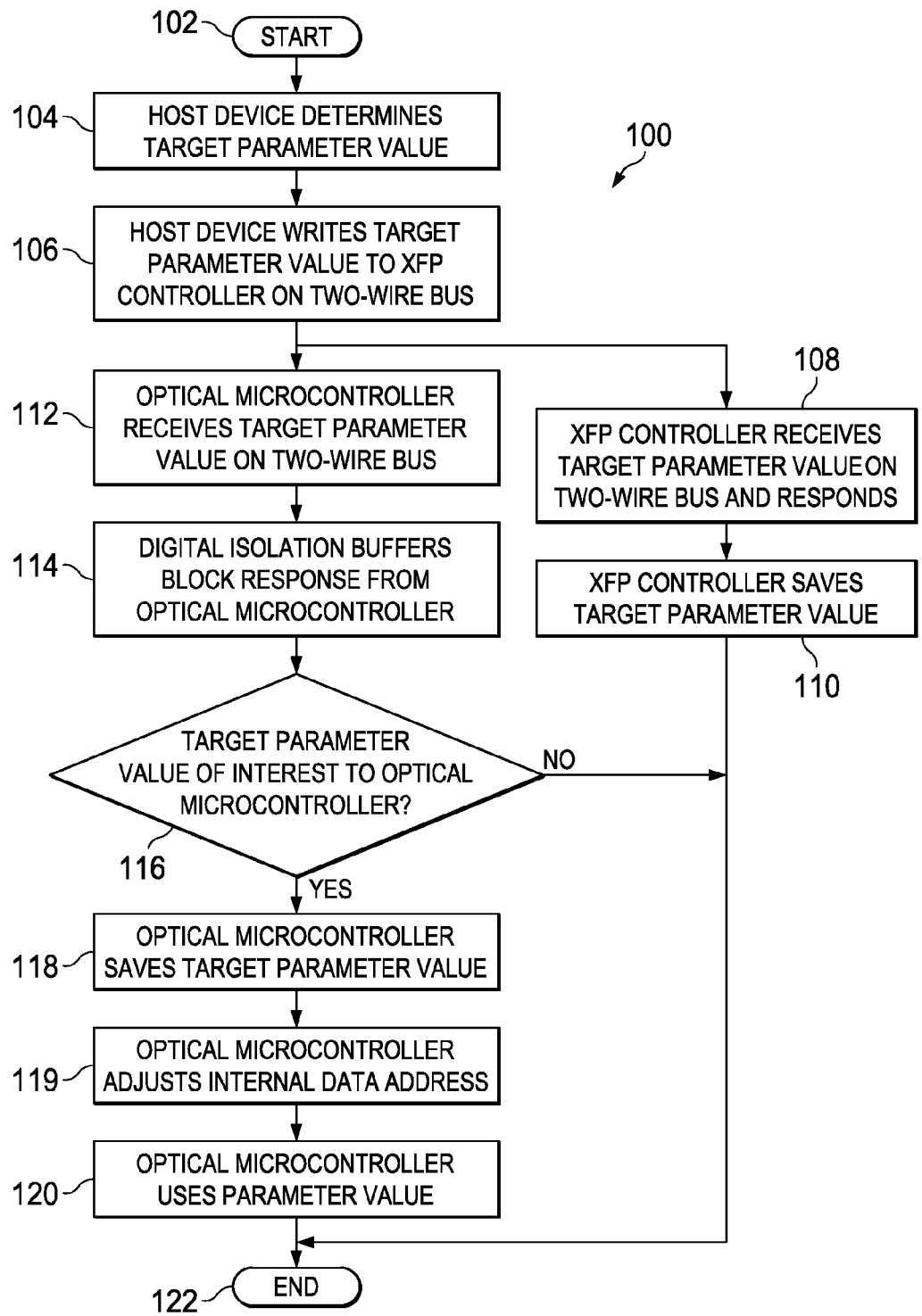
FIG. 4 is a simplified flow diagram illustrating potential operations that may be associated with the communication system.

Turning to FIG. 4, FIG. 4 is a simplified flow diagram illustrating example operational steps 100 that may be associated with embodiments of the present disclosure. This particular set of operations may start at 102, when XFP module 19 is plugged into PLIM 44. At 104, host device 46 determines a target parameter value. For example, the target parameter value may be a calibration value for laser temperature. In some embodiments, the user programs a host device with the target parameter value. At 106, host device 46 writes the target parameter value to XFP controller 40 on two-wire bus 48. In one embodiment, host device 46 writes the target parameter value to Table 02h of XFP controller's memory, according to certain XFP standards. At 108, XFP controller 40 receives the target parameter value on two-wire bus 48 and responds appropriately (e.g., with an ACK signal). At 110, XFP controller 40 saves the target parameter value (e.g., writes to Table 02h).

At 112, the optical microcontroller receives the target parameter value on two-wire bus 48. At 114, digital isolation buffers 54 block any response (e.g., ACK, NACK, clock stretch signal, etc.) from optical microcontroller 42. At 116, optical microcontroller 42 determines whether the target parameter value is of interest to optical microcontroller 42. For example, the target parameter may be of interest if it is related to the functions of optical microcontroller 42 such as laser temperature, bias control, or modulator bias control. If the target parameter value is of interest, optical microcontroller 42 saves the target parameter value at 118.

At 119, optical microcontroller appropriately adjusts its internal data address. According to certain XFP standards, XFP module 19 may maintain an internal data address containing the last address accessed during the latest read or write operation. The address counter may be incremented whenever a data word is received or sent by XFP module 19. This address may stay valid between operations as long as XFP module 19 is powered on. Thus, for every read or write operation, XFP module 19 adjusts its internal data address counter. For certain single byte read or write operations (e.g., where the data address counter is in the middle of the data address block), the data address may be incremented by one. For multi-byte read or write, the adjustment to the internal data word address counter may be larger than one. Moreover, if the memory block exceeds the top of the 128-byte memory block, the counter may wrap around to the bottom of the 128-byte block. In example embodiments, XFP controller 40 (which is an XFP compliant controller) may perform the adjusting operation as programmed according to certain XFP standards. Optical microcontroller 42 may be additionally programmed to adjust its internal data address whenever there is a read operation from, or a write operation to, Table 02h of XFP controller 40. At 120, optical microcontroller 42 uses the value of the parameter for controlling functions. If the target parameter value is not of interest as determined at 116, the operations end at 120.

Figure 5:
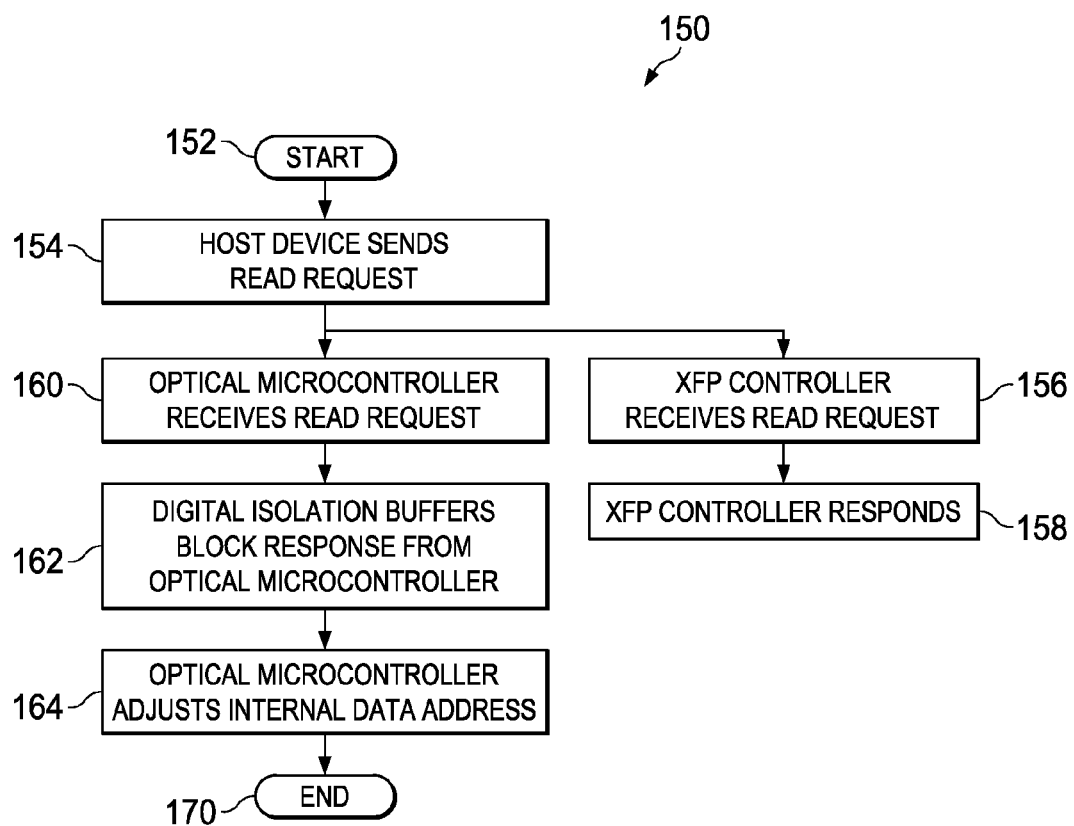
FIG. 5 is a simplified flow diagram illustrating potential operations that may be associated with the communication system.

Turning to FIG. 5, FIG. 5 is a simplified flow diagram illustrating example operational steps 150 that may be associated with embodiments of the present disclosure. This particular set of operations may start at 152, when a communication is initiated on two-wire bus 48. At 154, host device 46 sends a read request on two-wire bus 48 (e.g., request to read a value from Table 02h on XFP controller 40). At 156, XFP controller 40 receives the read request. At 158, XFP controller 40 responds (e.g., with the requested value). At 160, optical microcontroller 42 receives the read request. At 162, digital isolation buffers 54 block any response (e.g., ACK, NACK, clock stretch signal, etc.) from optical microcontroller 42 to host device 46. At 164, optical microcontroller 42 adjusts its internal data address. The process may end at 164. Note that in various embodiments, read operations from memory partitions other than Table 02h of XFP controller 40 may be ignored by optical microcontroller 42.

The operational steps according to example embodiments may allow for built-in two-wire protocol handlers (typically available on many processors) to be used without change. That is, the operational steps may allow for a repurposing of readily available merchant silicon (e.g., off-the-shelf component, or catalog component) to an application requiring additional functionality (e.g., pre-distortion and precision module direct current (DC) bias point tracking) without generating custom silicon.

Figure 6:
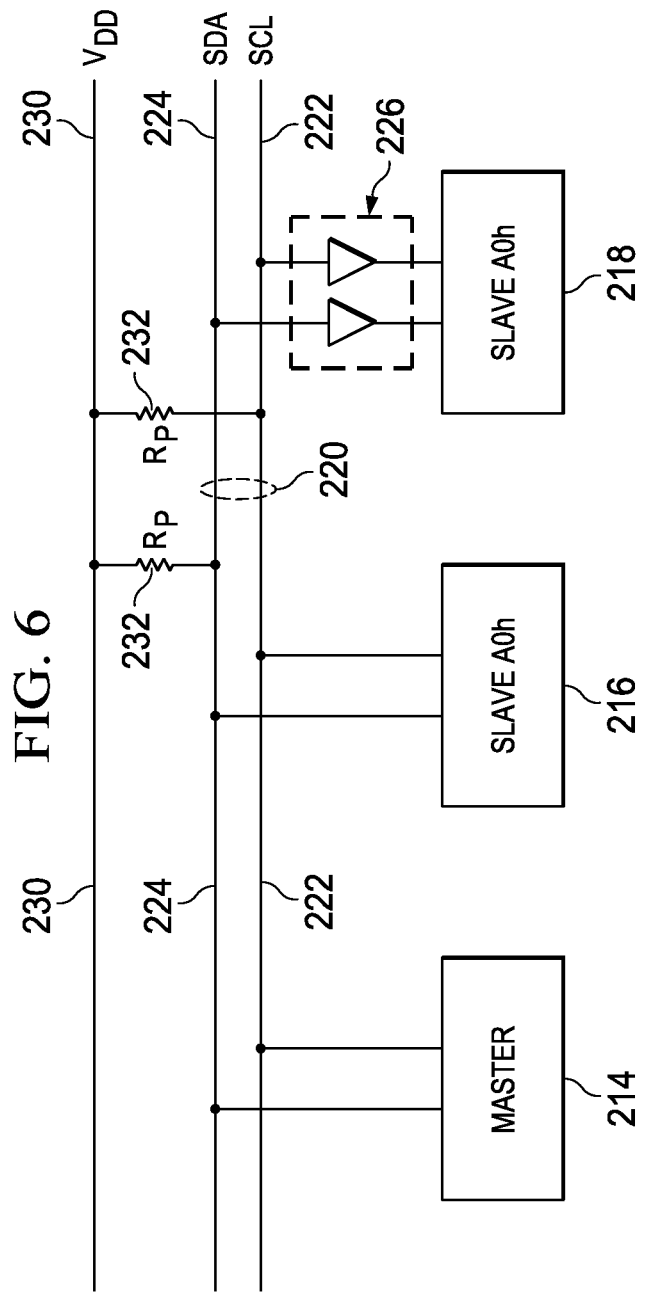
FIG. 6 is a simplified block diagram illustrating a communication system for monitoring two-wire communication in a network environment according to an embodiment of the present disclosure.

Turning to FIG. 6, FIG. 6 is a simplified schematic diagram showing an embodiment of communication system 10. A master 214 is connected to a first slave 216 and a second slave 218. First slave 216 and second slave 218 share the same address. In an example embodiment, master 214 may be a component on a PLIM, first slave 216 may be an XFP controller inside an XFP module, second slave 218 be a general-purpose microcontroller in the XFP module, and the shared address may be A0h, according to certain XFP standards. Master 214 transmits a signal on a two-wire bus 220 to address A0h.

Two-wire bus 220 includes a serial clock line (SCL) 222 and a serial data line (SDA) 224. SCL 500 and SDA 224 may be pulled up to supply line $V_{DD}$ 230 with pull up resistors RP 232. Pulling the line to ground can be considered a logical 'zero' while letting the line float can be a logical 'one.' Typical $V_{DD}$ voltages include 5 VDC or 3.3 VDC although systems with other voltages are permitted within the broad teachings of the present disclosure. Signals from second slave 218 to master 214 are blocked by a set of digital isolation buffers 226. One of digital isolation buffers 226 is located on SCL 222 between master 214 and second slave 218, and another of digital isolation buffers 226 is located on SDA 224 between master 214 and second slave 218.

When master 214 transmits a signal over two-wire bus 220 to the address (e.g., A0h), both first slave 216 and second slave 218 may receive the signal and respond to the signal. In an example, the master initially transmits a START signal followed by the address of the slave it wishes to communicate with (e.g. A0h), which is followed by another bit representing whether it wishes to write to (e.g., 0) or read from (e.g., 1) the slave. If the slave exists on the bus, then it can respond with an acknowledgement (ACK) signal (e.g., 0) for that address. If the slave is unable to accept the data, it may respond with a NACK signal (e.g., 1) that, in an environment of a floating high value, may be equivalent to no response. In example embodiments, both first slave 216 and second slave 218 may respond with ACK signals because they share the same address (e.g., A0h). In some embodiments, one or both slaves may respond with clock stretch signals.

However, the response from second slave 218 may be blocked by digital isolation buffers 226, and master 214 receives the response from first slave 216 only. Master 214 then continues in either transmit or receive mode (according to the read/write signals it sent), and the slaves (e.g., first slave 216 and second slave 218) continue in their complementary modes (receive or transmit, respectively). Signals are received by second slave 218, but signals that it transmits are blocked from master 214 (or first slave 216) by digital isolation buffers 226.

Generally, the START signal can be indicated by a high-to-low transition of SDA 224 with SCL 222 high; the STOP signal can be indicated by a low-to-high transition of SDA 224 with SCL 222 high. Except for the START and STOP signals, SDA 224 may change only while SCL 222 is low; transmitting a data bit can consist of pulsing SCL 222 high while holding SDA 224 steady at a desired level. If master 214 wishes to write to the slaves (e.g., first slave 216 and second slave 218), then it may repeatedly send a byte, with the slaves (e.g., first slave 216 and second slave 218) sending an ACK bit each. Digital isolation buffers 226 block responses from second slave 218 so that master 214 receives ACK signals only from first slave 216. Master 214 may end transmission with a STOP signal, or it may send another START signal if it wishes to retain control of the bus for another transfer.

Figure 7:
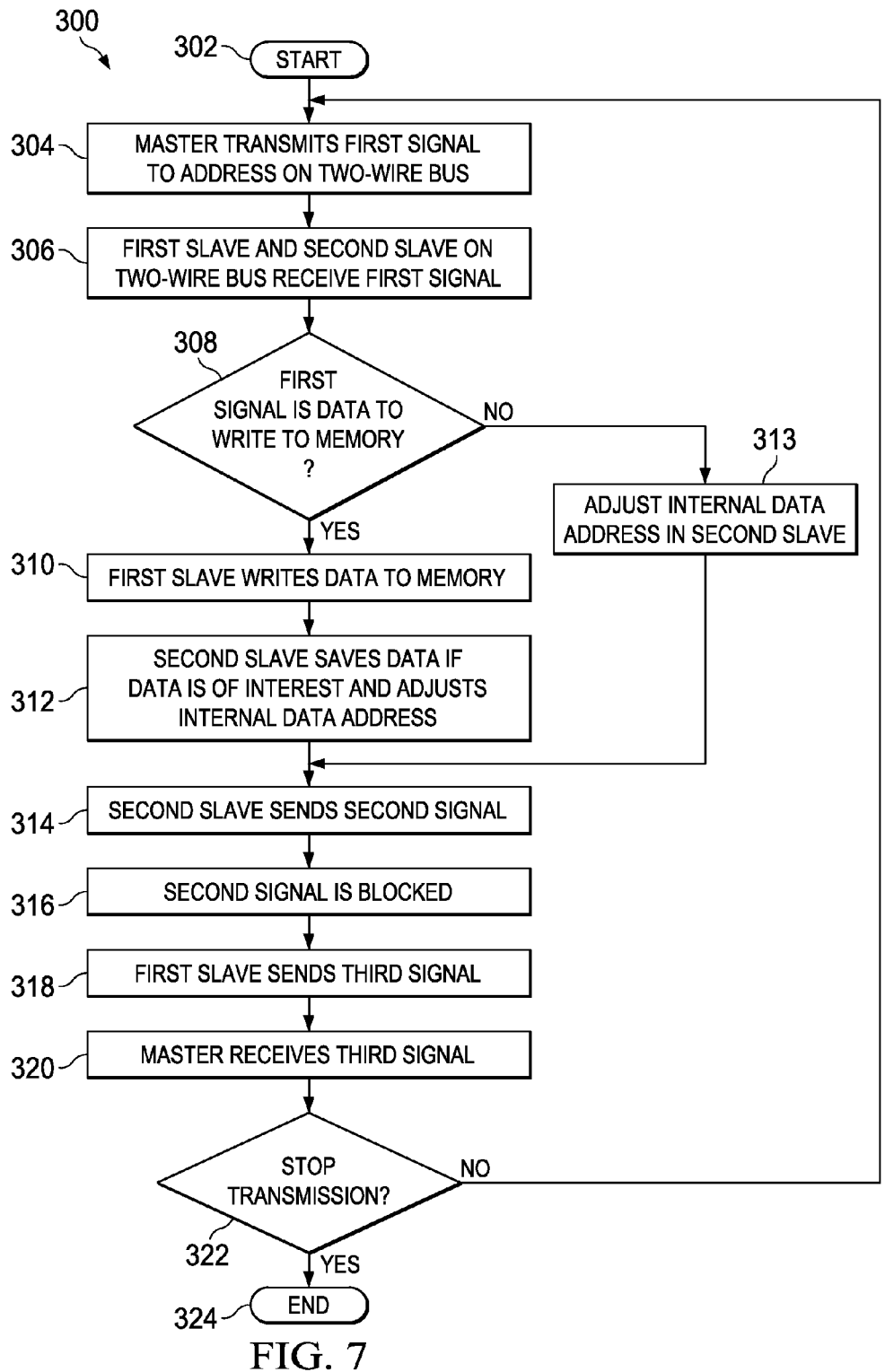
FIG. 7 is a simplified flow diagram illustrating potential operations that may be associated with the communication system.

Turning to FIG. 7, FIG. 7 is a simplified flow diagram illustrating example operational steps 300 that may be associated with embodiments of the present disclosure. This particular set of operations starts at 302, when communication system 10 is activated. At 304, master 214 transmits a first signal to an address (e.g., A0h) on two-wire bus 220. At 306, first slave 216 and second slave 218, which share the address, receive the first signal. At 308, a determination is made if the first signal is data to write to memory at the address. If the first signal is data to write to memory (for example, first signal may be a target value of laser temperature), first slave 216 may write the data to memory (e.g., Table 02h) at 310. At 312, second slave 218 saves the data if the data is of interest and may adjust its internal data address appropriately. For example, if the data is a parameter value that is related to one of the second slave's functions (such as laser temperature control parameter), the data may be of interest to second slave 218.

If the first signal is data to read from memory (rather than data to write to memory), second slave 218 may adjust its internal data address at 313. Note that in various embodiments, second slave 218 may ignore read or write operations to certain memory locations of first slave 216 (e.g., such read or write operations may not be of interest to second slave 218). At 314, second slave 218 sends a second signal. The second signal may be an ACK bit in response to the first signal. In some embodiments, the second signal may be a signal that is unrelated to the first signal. The second signal from second slave 218 is blocked by digital isolation buffers 216 at 316. At 318, first slave 216 sends a third signal. For example, the third signal may be an ACK bit in response to the first signal. At 320, master 214 receives the third signal. At 322, master 214 makes a determination whether to stop transmission. If not, the operations step back to 304, and continue thereafter. If transmission is to be stopped, the operations end at 324, with a STOP signal from master 214 to first slave 216 and second slave 218.

Note that certain example embodiments are described in this Specification in conjunction with an XFP module and associated components. However, the broad teachings of the disclosure are generally applicable to a wide variety of embodiments that may be unrelated to XFP modules. In particular, the broad teachings of the present disclosure may be generally applicable to any instance of a two-wire bus connecting multiple components, wherein at least two components share an address on the two-wire bus. For example, two-wire buses embodying the teachings of the present disclosure may be used on computer peripherals, embedded systems, cell phones, or any other electronic devices.

In example embodiments, at least some portions of the activities outlined herein may be implemented in software (e.g., provided in a non-transitory media for performing activities discussed herein). In some embodiments, one or more of these features may be implemented in hardware, provided external to these elements, or consolidated in any appropriate manner to achieve the intended functionality. XFP module 19/optical transmitter 18 may include software (or reciprocating software) that can coordinate in order to achieve the operations as outlined herein. In embodiments, these elements may include any suitable algorithms, hardware, software, components, modules, logic gates, integrated circuitry, interfaces, or objects that facilitate the operations thereof.

Furthermore, the components described and shown herein may also include suitable interfaces for receiving, transmitting, and/or otherwise communicating data or information in a network environment. Additionally, some of the processors and memory elements associated with the various electronic elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In example embodiments, one or more memory (e.g., memory in XFP controller 40 and optical microcontroller 42) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., associated with XFP controller 40 or optical microcontroller 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an EEPROM), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communication system 10 may further keep information in any suitable type of memory (e.g., random access memory (RAM), read only memory (ROM), FPGA, EPROM, EEPROM, etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

Note that with the numerous examples provided herein, interaction may be described in terms of two, three, four, or more electronic elements. However, this has been done for purposes of clarity and example only. It should be appreciated that the system can be consolidated in any suitable manner. Along similar design alternatives, any of the illustrated components, modules, devices, and elements of the FIGURES may be combined in various possible configurations, all of which are clearly within the broad scope of this Specification. In certain cases, it may be easier to describe one or more of the functionalities of a given set of flows by only referencing a limited number of electronic elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, from a host device, a first signal transmitted over a two-wire bus to an address on the two-wire bus corresponding to a small form factor (XFP) module, the host device being located outside the XFP module, the two-wire bus coupling the host device with a first controller inside the XFP module and a second controller inside the XFP module that share the address such that the first controller and the second controller receive the first signal; and
blocking a second signal from the second controller to the host device using digital isolation buffers.

2. The method of claim 1, wherein a third signal from the first controller to the host device over the two-wire bus is not blocked.

3. The method of claim 1, wherein the first controller comprises a XFP compliant controller and the second controller comprises an optical controller.

4. The method of claim 1, wherein outputs of the digital isolation buffers are sent to the second controller.

5. The method of claim 1, wherein the second controller responds to the first signal with the second signal.

6. The method of claim 1, wherein the first signal comprises a write operation of calibration values to the first controller's memory, wherein the second controller allows the calibration values to be written to the second controller's memory if the calibration values are of interest to the second controller.

7. The method of claim 6, wherein the second controller uses the written values as calibration values for appropriate parameters.

8. The method of claim 1, wherein the first signal comprises a read operation of a particular memory address in the XFP module, wherein the digital isolation buffers block any response by the second controller to the read operation.

9. The method of claim 1, wherein an internal bootstrap loader allows the second controller to be programmed over the two-wire bus.

10. The method of claim 1, wherein the first controller serves as a proxy for the second controller, wherein the second controller cannot communicate with the host device such that it can send signals over the two-wire bus, or fail to respond, without interfering with communication over the two-wire bus between the host device and the first controller.

11. Logic encoded in non-transitory media that includes code for execution and when executed by a processor is operable to perform operations comprising:
receiving, from a host device, a first signal transmitted over a two-wire bus to an address on the two-wire bus corresponding to an XFP module, the host device being located outside the XFP module, the two-wire bus coupling the host device with a first controller inside the XFP module and a second controller inside the XFP module that share the address such that the first controller and the second controller receive the first signal; and
blocking a second signal from the second controller to the host device using digital isolation buffers.

12. The logic of claim 11, wherein a third signal from the first controller to the host device over the two-wire bus is not blocked.

13. The logic of claim 11, wherein the first controller comprises a XFP compliant controller and the second controller comprises an optical controller.

14. The logic of claim 11, wherein the first signal comprises a write operation of calibration values to the first controller's memory, wherein the second controller allows the calibration values to be written to the second controller's memory if the calibration values are of interest to the second controller.

15. The logic of claim 11, wherein the first signal comprises a read operation of a particular memory address in the XFP module, wherein the digital isolation buffers block any response by the second controller to the read operation.

16. An apparatus having an address on a two-wire bus, comprising:
a memory configured to store data;
a processor operable to execute instructions associated with the data;
a first controller and a second controller connected on the two-wire bus at the address;
digital isolation buffers such that the apparatus is configured for:
receiving a first signal transmitted from a host device located outside the apparatus to the address over the two-wire bus, such that the first controller and the second controller receive the first signal; and
blocking a second signal from the second controller to the host device using the digital isolation buffers.

17. The apparatus of claim 16, wherein a third signal from the first controller to the host device over the two-wire bus is not blocked.

18. The apparatus of claim 16, wherein the first controller comprises a XFP compliant controller and the second controller comprises an optical controller.

19. The apparatus of claim 16, wherein the first signal comprises a write operation of calibration values to the first controller's memory, wherein the second controller allows the calibration values to be written to the second controller's memory if the calibration values are of interest to the second controller.

20. The apparatus of claim 16, wherein the first signal comprises a read operation of a particular memory address in the XFP module, wherein the digital isolation buffers block any response by the second controller to the read operation.

* * * * *